Patented Jan. 5, 1943

2,307,624

UNITED STATES PATENT OFFICE 2,307,624

METHOD OF MAKING ORGANIC THIONITRATES

Richard S. George, State College, Pa., assignor to Socony-Vacuum Oil Company, Incorporated, New York, N. Y., a corporation of New York No Drawing. Application June 4, 1940, Serial No. 338,737

17 Claims. (Cl. 260—453)

This invention has to do with the synthesis of organic thionitrates and has as its principal object the provision of an improved process which will produce thionitrates economically in high yields and of a high quality.

Organic thionitrates are compounds characterized by the presence of the group —$SNO_2$, and my invention contemplates the synthesis of a thionitrate from an organic sulfur compound which is characterized by a radical selected from the group consisting of —SH; —SNO;

and

such groups characterizing the mercaptans or thiophenols; the organic thionitrites; the carbothiolic acids; and the carbodithioic acids, respectively. All of these compounds, with the exception of the thionitrite, are characterized by the presence of a mercapto (—SH) group, and, as will hereinafter appear, the thionitrite is formed as an intermediate product when a mercapto compound is employed as an initial reactant. Although my improved process, as just indicated, lends itself to synthesis of a thionitrate from the corresponding thionitrite, it is an outstanding advantage of this process that mercaptans can be used as the initial reactant because of their availability in commerce at relatively low cost.

I am aware of the fact that it has been proposed to prepare an alkyl thionitrate by oxidizing the corresponding thionitrite with fuming nitric acid. (Rheinbolt and Mott-Ber. 65-B, 1223-4 (1932).) In this process the thionitrite is dissolved in glacial acetic acid and three-fifths of the necessary quantity of nitric acid added. The solution is then heated on a water-bath until the reaction becomes vigorous, after which it is allowed to cool and the second portion of nitric acid added, followed by heating on a water bath and cooling. The thionitrate is then extracted with ether and finally recovered from the ether solution, after water-washing and drying, by distillation under reduced pressure.

In the process of the present invention an organic sulfur compound possessing one of the aforesaid characterizing groups is dissolved in a suitable volatile inert solvent, such as ether, and nitrogen tetroxide ($NO_2$ or $N_2O_4$) is introduced into the solution in an amount sufficient to convert the sulfur compound to the corresponding thionitrate. I have found it preferable to first cool the solution to a point substantially below the temperature at which the thionitrate is actively formed (which temperature may vary with different organic thiol reactants) before introducing the nitrogen tetroxide and then either permit the temperature to gradually rise to the conversion temperature or warm the solution to such temperature and thereafter maintain the temperature within a range below that at which substantial volatilization of oxides of nitrogen will take place until the reaction is complete. The solution is then freed of oxides of nitrogen and the thionitrate recovered from the solvent by distilling under reduced pressure.

The method contemplated herein has several advantages over the aforesaid procedure of the prior art. It permits the use of a single solvent medium, thereby eliminating the extraction step. It may be employed for the direct conversion of a mercaptan to the thionitrate, whereas the prior art method requires the formation of thionitrite as an initial reactant. In this same regard it will be observed that the entire conversion from a mercaptan to a thionitrate may be carried out in a single reaction vessel. Also the process of this invention gives a smooth conversion of the mercaptan to the thionitrate without the troublesome procedure of regulating the reaction conditions to suit the speed of reaction, as was the case in the method of the prior art. The method of this invention produces high yields of the thionitrate, whereas several attempts to practice the procedure of the prior art were successful to produce only traces of the thionitrate.

One of the chief uses of the thionitrates produced according to the method contemplated herein is as an addition agent to improve the ignition quality of diesel fuels. It is desirable, therefore, that the compounds be relatively stable, and with this in mind preference is given to the alkyl thionitrates with special preference to the tertiary alkyl compounds. Also, from the standpoint of economy the preferred procedure contemplated herein is one in which the initial reactant is a tertiary alkyl mercaptan.

Using a mercaptan as the initial reactant, the reaction which takes place in the process of this invention may be represented by the following equations:

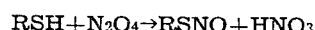
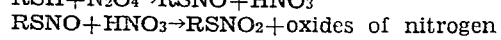

In carrying out the reaction it has been observed that the solution takes on the characteristic greenish-red thionitrite color soon after the addition of the nitrogen tetroxide, which indicates that the thionitrite is formed as an intermediate product. It also appears that the temperature factor is more or less critical to the second reaction. In the case of tertiary butyl mercaptan, for example, a vigorous reaction, in which the thionitrate was apparently formed, started at a temperature of 12° C.; and, as aforesaid, it is preferable to add the nitrogen tetroxide at a temperature below that at which this vigorous reaction takes place, although addition of the $N_2O_4$ at higher temperatures is not precluded. This temperature may vary with different mercaptans or thiol compounds. In case a thionitrite is employed as the initial reactant, it is also preferable to add the $N_2O_4$ below the point at which the conversion to thionitrate takes place.

Completion of the reaction is indicated by disappearance of the characteristic thionitrite color, the thionitrate being colorless, and while the reaction is in progress it is desirable to maintain the temperature range between that at which the vigorous reaction takes place (12° C. in the case of the tertiary butyl compound) and the temperature at which any substantial decomposition or any substantial volatilization of oxides of nitrogen may take place.

Further details in the process contemplated herein will be better understood from the following specific examples.

Example A

A solution of 1 part by weight of tertiary butyl mercaptan dissolved in about 3.6 parts by weight of ether was charged into a reaction vessel equipped with a stirrer. The solution was cooled to about 0° C. and while being held at that temperature the gas from about 1.4 parts by weight of liquid nitrogen tetroxide was slowly passed into the solution with continuous stirring. The characteristic greenish-red color of the thionitrite appeared soon after the addition of nitrogen tetroxide was started, indicating that the thionitrite was an intermediate product. After all of the nitrogen tetroxide had been added, the temperature was allowed to rise slowly to room temperature, during which time excess oxides of nitrogen were discharged and the characteristic thionitrite color disappeared. As an alternative for the foregoing step the mixture may be warmed to 12° C., at which point a rather vigorous reaction takes place with a rapid rise in temperature to 30° C., where the temperature is allowed to remain until the reaction is complete.

As aforesaid, the temperature in the neighborhood of 12° C. seems to be a critical one for the conversion of tertiary butyl mercaptan or tertiary butyl thionitrite to the corresponding thionitrate and the preferred range of reaction temperatures for these initial reactants is from about 12° C. to about 30° C. Although the preferred procedure involves introducing the nitrogen tetroxide at a temperature below this conversion temperature of 12° C., it is to be understood that the invention includes procedures in which this introduction may be made at higher temperatures.

After the reaction mixture had been stirred for about ½ hour at room temperature, a stream of nitrogen gas was run into the solution to free it of excess oxides of nitrogen remaining, after which it was water-washed, filtered through paper to remove suspended water, and distilled under reduced pressure. The yield of tertiary butyl thionitrate boiling at 55°–58° C. at 13 mm. pressure was 73 per cent of theoretical.

Example B

Following the same general procedure described above, tertiary butyl thionitrate was also prepared using a solution of 1 part by weight of tertiary butyl thionitrite (which may be obtained by the action of nitrous acid on the mercaptan or mercaptide) dissolved in about 2.7 parts by weight of ether, and reacting with about 0.8 part by weight of nitrogen tetroxide.

It is to be understood that the invention is not confined to the specific details given in the foregoing examples but includes within its scope such changes or modifications as fairly come within the spirit of the appended claims.

I claim:

1. The method of making organic thionitrates which includes the step of passing an excess of nitrogen tetroxide into a solution of an organic thiol compound at a temperature below that at which nitrogen tetroxide will substantially decompose and volatilize.

2. The method of making organic thionitrates which includes: dissolving an organic thiol compound in a volatile inert solvent; introducing nitrogen tetroxide into the solution in an amount in excess of the stoichiometric proportion required to convert said thiol compound to the corresponding thionitrate; maintaining the temperature of the solution in the range between the temperature at which vigorous reaction takes place and the temperature at which oxides of nitrogen are substantially volatilized until the characteristic thionitrite color is discharged; and then purging the solution of excess oxides of nitrogen and removing the solvent by distillation.

3. The method of making organic thionitrates which includes: dissolving an organic thiol compound in a volatile inert solvent; cooling the solution to a temperature below that at which vigorous reaction of the thiol compound and nitrogen tetroxide will take place; introducing nitrogen tetroxide into the solution in an amount in excess of the stoichiometric proportion required to convert said thiol compound to the corresponding thionitrate; raising the temperature of the solution until vigorous reaction starts and thereafter maintaining the temperature below the point at which oxides of nitrogen will be substantially volatilized until the characteristic thionitrite color is discharged; and then purging the solution of excess oxides of nitrogen and removing the solvent by distillation.

4. The method of making organic thionitrates which includes: dissolving an organic thiol compound in a volatile inert solvent; cooling the solution to a temperature below that at which vigorous conversion of the organic thiol compound to the thionitrate by nitrogen tetroxide will take place; adding nitrogen tetroxide to the solution in an amount sufficient to convert said organic thiol compound to the corresponding organic thionitrate; raising the temperature of the solution to bring about conversion of the organic thiol compound to the corresponding thionitrate; maintaining the temperature of the solution between the temperature at which said conversion reaction starts and the temperature at which substantial volatilization of the nitrogen tetroxide will take place until the reaction is complete, as evidenced by the disappearance of the characterizing thionitrite color; freeing the solution of excess oxides of nitrogen; and distilling under reduced pressure to remove the solvent.

5. The method of making an alkyl thionitrate which includes the step of introducing an excess of nitrogen tetroxide into an ether solution of an alkyl mercaptan at a temperature below that at which the nitrogen tetroxide will substantially decompose and volatilize.

6. The method of making an alkyl thionitrate which includes: forming an ether solution of an alkyl mercaptan; introducing an excess of nitrogen tetroxide into the solution at a temperature below 30° C.; and maintaining the temperature of the solution above the temperature at which conversion to the alkyl thionitrate takes place as evidenced by vigorous reaction and below the temperature at which any substantial volatilization of the nitrogen tetroxide will take place until the characteristic color of the alkyl thionitrite is discharged; freeing the solution of excess nitrogen tetroxide; and distilling under reduced pressure to remove the ether.

7. The method of making an alkyl thionitrate which includes: forming an ether solution of an alkyl thionitrite; introducing an excess of nitrogen tetroxide into the solution at a temperature below 30° C.; maintaining the temperature of the solution above the temperture at which conversion to the alkyl thionitrate takes place as evidenced by vigorous reaction and below the temperature at which any substantial volatilization of the nitrogen tetroxide will take place until the characteristic color of the alkyl thionitrite is discharged; freeing the solution of excess oxides of nitrogen; and distilling under reduced pressure to remove the ether.

8. The method of making an alkyl thionitrate by the reaction of nitrogen tetroxide with an alkyl mercaptan to form successively the corresponding thionitrite and thionitrate which includes dissolving the mercaptan in an inert solvent; introducing nitrogen tetroxide in a quantity sufficient to convert the mercaptan to the thionitrate; and maintaining the temperature of the solution above the temperature at which conversion to the thionitrate takes place as evidenced by vigorous reaction and below the temperature at which substantial volatilization of the nitrogen tetroxide will take place until the characteristic color of the thionitrite is discharged.

9. The method of making tertiary butyl thionitrate which includes adding an excess of nitrogen tetroxide to an ether solution of tertiary butyl mercaptan at a temperature below 30° C. and maintaining the temperature of the solution between about 12° C. and about 30° C. until the characteristic color of tertiary butyl thionitrite is discharged.

10. The method of making tertiary butyl thionitrate which includes introducing an excess of nitrogen tetroxide into an ether solution of tertiary butyl mercaptan at a temperature below 12° C. and then permitting the temperature to rise above 12° C.

11. The method of making tertiary butyl thionitrate which includes: forming a solution of tertiary butyl mercaptan in an inert solvent; cooling the solution to a temperature of about 0° C.; slowly adding an excess of nitrogen tetroxide to the cooled solution; raising the temperature of the solution to above 12° C. and thereafter maintaining the temperature above 12° C. and below the temperature at which substantial volatilization of nitrogen tetroxide will take place until the characteristic thionitrite color is discharged.

12. The method of making tertiary butyl thionitrate which includes adding an excess of nitrogen tetroxide to an ether solution of tertiary butyl thionitrite at a temperature below 30° C. and maintaining the temperature of the solution between 12° C. and 30° C. until the characteristic color of the butyl thionitrite is discharged.

13. The method of making tertiary butyl thionitrate which includes forming a solution of tertiary butyl thionitrite in an inert solvent; adding an excess of nitrogen tetroxide to the solution at a temperature between about 0° C. and 30° C. and thereafter maintaining the temperature of the solution between 12° C. and 30° C. until the characteristic color of the butyl thionitrite is discharged.

14. The method of making tertiary butyl thionitrate which includes: forming a solution of tertiary butyl mercaptan in an inert solvent; cooling the solution to a temperature between 0° C. and 12° C.; adding an excess of nitrogen tetroxide to the solution; maintaining the temperature of the solution within a range between 12° C. and the temperature at which substantial volatilization of nitrogen tetroxide will take place until the characteristic color of the thionitrite is discharged; freeing the solution of excess nitrogen tetroxide; and distilling under reduced pressure to separate the solvent from the butyl thionitrate formed.

15. The method of making tertiary butyl thionitrate which includes: forming a solution of tertiary butyl mercaptan in an inert solvent; cooling the solution to a temperature below 30° C.; adding an excess of nitrogen tetroxide to the solution; maintaining the temperature of the solution within a range between 12° C. and the temperature at which substantial volatilization of nitrogen tetroxide will take place until the characteristic color of the thionitrite is discharged; freeing the solution of excess nitrogen tetroxide; and distilling under reduced pressure to separate the solvent from the butyl thionitrate formed.

16. The method of making tertiary butyl thionitrate which includes forming a solution of tertiary butyl thionitrite in an inert solvent; adding an excess of nitrogen tetroxide to the solution at a temperature below 30° C. and maintaining the temperature of the solution between 12° C. and 30° C. until the characteristic color of the butyl thionitrite is discharged; freeing the solution of excess oxides of nitrogen; and distilling under reduced pressure to separate the solvent from the butyl thionitrate formed.

17. The method for making tertiary butyl thionitrate which comprises: forming an ether solution of tertiary butyl mercaptan; cooling the solution to about 0° C. and introducing an excess of gaseous nitrogen tetroxide with continuous stirring; permitting the temperature to rise to room temperature; and then purging the solution of excess of oxides of nitrogen and distilling under reduced pressure to remove the solvent.

RICHARD S. GEORGE.